United States Patent [19]

Hoagland et al.

[11] Patent Number: 5,264,058
[45] Date of Patent: Nov. 23, 1993

[54] FORMING A SHAPED PRELAMINATE AND BILAYER GLAZING OF GLASS AND PLASTIC

[75] Inventors: Johh C. Hoagland, Longmeadow; John C. Kislus, Chicopee; James R. Moran, Longmeadow; Marcin T. Wardak, Agawam, all of Mass.

[73] Assignee: Monsanto, St. Louis, Mo.

[21] Appl. No.: 933,546

[22] Filed: Aug. 24, 1992

[51] Int. Cl.⁵ .............................. B32B 31/04
[52] U.S. Cl. ........................ 156/99; 156/102; 156/104; 156/212; 156/242; 156/245; 156/285; 156/286; 156/322; 156/324.4
[58] Field of Search ............. 156/99, 102, 104, 212, 156/242, 245, 285, 286, 322, 324.4

[56] References Cited

U.S. PATENT DOCUMENTS

| | | |
|---|---|---|
| 4,152,188 | 5/1929 | Friedrich et al. .................. 156/102 |
| 4,194,938 | 3/1980 | Figge et al. ....................... 156/322 |
| 4,201,612 | 5/1980 | Figge et al. ....................... 156/322 |
| 4,445,953 | 5/1984 | Hawk ............................... 156/102 |
| 4,798,690 | 1/1989 | Levy ................................. 156/102 |
| 4,842,664 | 6/1989 | Baudin .............................. 156/102 |
| 4,944,822 | 7/1990 | Ishikawa et al. .................. 156/212 |
| 4,973,364 | 11/1990 | Farrar et al. ..................... 156/84 |
| 5,069,734 | 12/1991 | Kavanagh et al. ................ 156/84 |
| 5,082,515 | 1/1992 | Cartier et al. .................... 156/212 |

Primary Examiner—Caleb Weston
Attorney, Agent, or Firm—Michael J. Murphy; Mark F. Wachter

[57] ABSTRACT

A process for forming a shaped prelaminate of glass and plastic by a) drawing an assembly of plastic layers against a hot, contoured, e.g. of compound curvature, mold surface to provide a shaped plastic preform at elevated temperature; b) transferring the shaped preform without cooling to an adjacent unheated glass layer of substantially matching surface contour to heat bond the shaped plastic preform to the glass layer; and then c) removing heat from the shaped plastic preform via conductive heat transfer to the glass layer to form the shaped prelaminate of glass and plastic layers. A bilayer glazing panel is formed in a conventional unmodified autoclave bonding system by exposing the prelaminate to elevated temperature and pressure to firmly bond the plastic to the glass.

16 Claims, 3 Drawing Sheets

FORMING A SHAPED PRELAMINATE AND BILAYER GLAZING OF GLASS AND PLASTIC

BACKGROUND OF THE INVENTION

This invention relates to bilayer safety glazings and more particularly to a method of forming a prelaminate for use in forming a bilayer safety panel.

Laminated glazings for vehicle windshields, sidelights, rear lights, sun-roofs, architectural glass including sky lights, security glass and the like are known. A bilayer form is a laminate of transparent glass and layers of laminated plastic on one side only of the glass. Non-planar bilayer glazing panels are also known as are problems of objectionable streaks, lines, wrinkles and other optical deficiencies in one or more of the plastic layers. Such problems are addressed in the following prior art patents. While moderately successful, the systems of these patents are not without deficiencies.

U.S. Pat. No. 4,944,822—glass and plastic layers are joined by a room temperature bondable adhesive. The separately applied adhesive must be optically compatible with the other components of the bilayer.

U.S. Pat. No. 5,069,734—a shaped plastic prelaminate preformed in the absence of glass is later mated with and bonded to glass of matching curvature. The surface curvature of the bent glass must exactly match the shaped prelaminate or optical properties of the finished bilayer are adversely affected.

U.S. Pat. No. 5,082,515—plastic layers are shaped against and then bonded to glass within an autoclave laminating assembly. Conventional autoclave bonding systems must be revised and cycles extended to accommodate plastic shaping.

SUMMARY OF THE INVENTION

Now, process improvements have been made further developing the art of forming bilayer glazings.

Accordingly, a principal object of this invention is an improved process of reduced complexity for forming a semi-finished prelaminate of layered glass and plastic usable to form a wrinkle-free bilayer glazing panel of non-planar shape.

Another object is to uncouple plastic shaping from autoclave bonding in forming a bilayer glazing panel of compound curvature.

A further object is to provide an improved, industrially valuable process for forming such a prelaminate which can be used with conventional autoclave bonding systems.

Other objects will in part be obvious and will in part appear from the following detailed description and claims.

These and other objects are accomplished by a process for forming a shaped prelaminate of glass and plastic which comprises: a) drawing an assembly of plastic layers against a hot, contoured, e.g. of compound curvature, mold surface to provide a shaped plastic preform at elevated temperature; b) transferring the shaped preform without cooling to an adjacent unheated glass layer of substantially matching surface contour to heat bond the shaped plastic preform to the glass layer; and then c) removing heat from the shaped plastic preform via conductive heat transfer to the glass layer to form the shaped prelaminate of glass and plastic.

The glass layer of the prelaminate serves as a heat sink to relatively rapidly remove heat in the plastic layers associated with shaping. The shaped layers are transferred while hot to the complementarily shaped glass where plastic deformation before cooling can compensate for any minute differences in contour between glass and shaped preform. The bilayer glazing panel is then formed from the shaped plastic-glass prelaminate using conventional cycles in an unmodified downstream conventional autoclave bonding system.

Also, in the process of forming a prelaminate of layered glass and plastic by steps which include drawing an assembly of optionally lightly bonded plastic layers against a non-planar molding surface, there is provided, in combination therewith, the step, before drawing, of clamping the assembly of plastic layers between opposing members of a non-planar clamp to form a configuration of the plastic layers approaching that of the molding surface.

BRIEF DESCRIPTION OF THE DRAWINGS

In describing the overall invention, reference will be made to the accompanying drawings wherein.

DETAILED DESCRIPTION OF PREFERRED EMBODIMENTS

Figure 1:
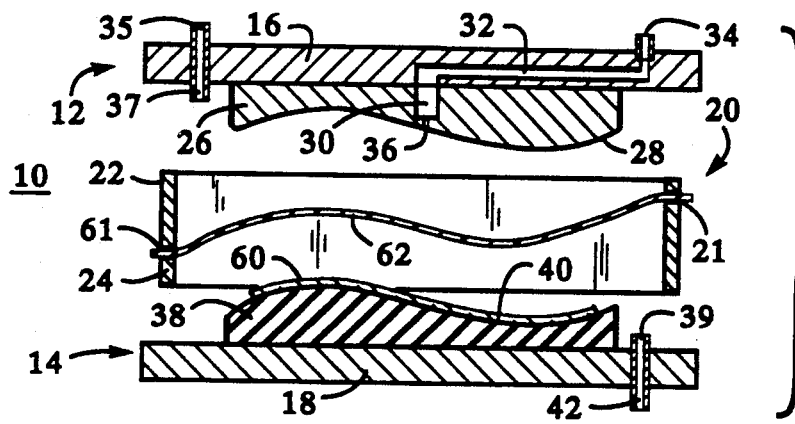
FIGS. 1-5 are elevational, schematic views of a system carrying out sequential steps of the process of the invention.

Referring now to the drawings, apparatus in the form of a press 10 (FIG. 1) is depicted which is capable in sequential steps of forming a shaped prelaminate of glass and plastic layers. Press 10 comprises upper and lower sections 12, 14 which respectively include upper metal platen 16 and lower metal platen 18. Clamp 20 between upper and lower sections 12 and 14 comprises upper 22 and lower 24 clamp frame members which are closable on an assembly of plastic layers interposed therebetween in a manner to be further described. Conventional fluid-operated piston-cylinder assemblies (not shown) associated with upper and lower sections 12, 14 of press 10 and upper and lower clamp frame members 22, 24 of clamp 20 vertically shift such components toward and away from each other in a coordinated manner to be further described.

Mold 26 fixed on platen 16 of upper section 12 includes downwardly facing molding surface 28 of polished aluminum or equivalent. Surface 28 may optionally have an anti-stick release coating thereon. Molding surface 28 in surface contour is non-planar insofar as possessing some degree of curvature. The process to be described is especially suited for use with shapes of compound curvature, such as shown for surface 28 in FIGS. 1-5, by which is meant that stretching of a planar plastic layer is necessary in conforming such layer into unwrinkled surface contact with the compound curvature surface. Central passage 30 in mold 26 communicates via passage 32 and nozzle 34 in platen 16 with a source of pressure (positive or negative), not shown, appropriately valved in conventional automated manner to provide such vacuum or pressure. Central passage 30 communicates with small circular holes about 0.006 to 0.020 inch (0.015–0.051 cm) in diameter in molding surface 28 illustratively shown as 36 in FIG. 1. Holes 36 can vary in number and location from that shown and be anywhere in surface 28 depending on the size and shape of the prelaminate being formed. Upper platen 16 is operably associated with a heating means such as a conventional electrical resistance heater, not shown, to heat mold 26 and molding surface 28 to a preselected temperature.

Lower section 14 of press 10 includes upwardly facing support 38 vertically aligned below mold 26 and fixed on lower platen 18. Support surface 40 of support 38 in a manner to be described functions as a support against breakage for a fragile glass layer. As long as fulfilling this function, surface 40 may vary in shape from that shown and is preferably a substantial complementarily shaped negative of that of molding surface 28. Surface 40 is preferably yieldable being formed, for example, of an elastomeric material such as silicone rubber. Alternatively, support 38 may be a manually deformable shape-sustaining member such as the canvas bag partially filled with spherical glass beads disclosed in commonly owned copending U.S. application Ser. No. 07/803,933 filed Dec. 6, 1991, for Mold For A Shaped Laminate, the content of which is incorporated herein by reference. Nozzles 39, 42 on either side of lower platen 18 communicate through a passage in platen 18. Nozzle 42 is in open communication with a valved source of vacuum, not shown. As illustrated in FIG. 1, frame members 22, 24 of clamp 20 circumscribe but are outboard of mold 26 and support 38.

Figure 6:
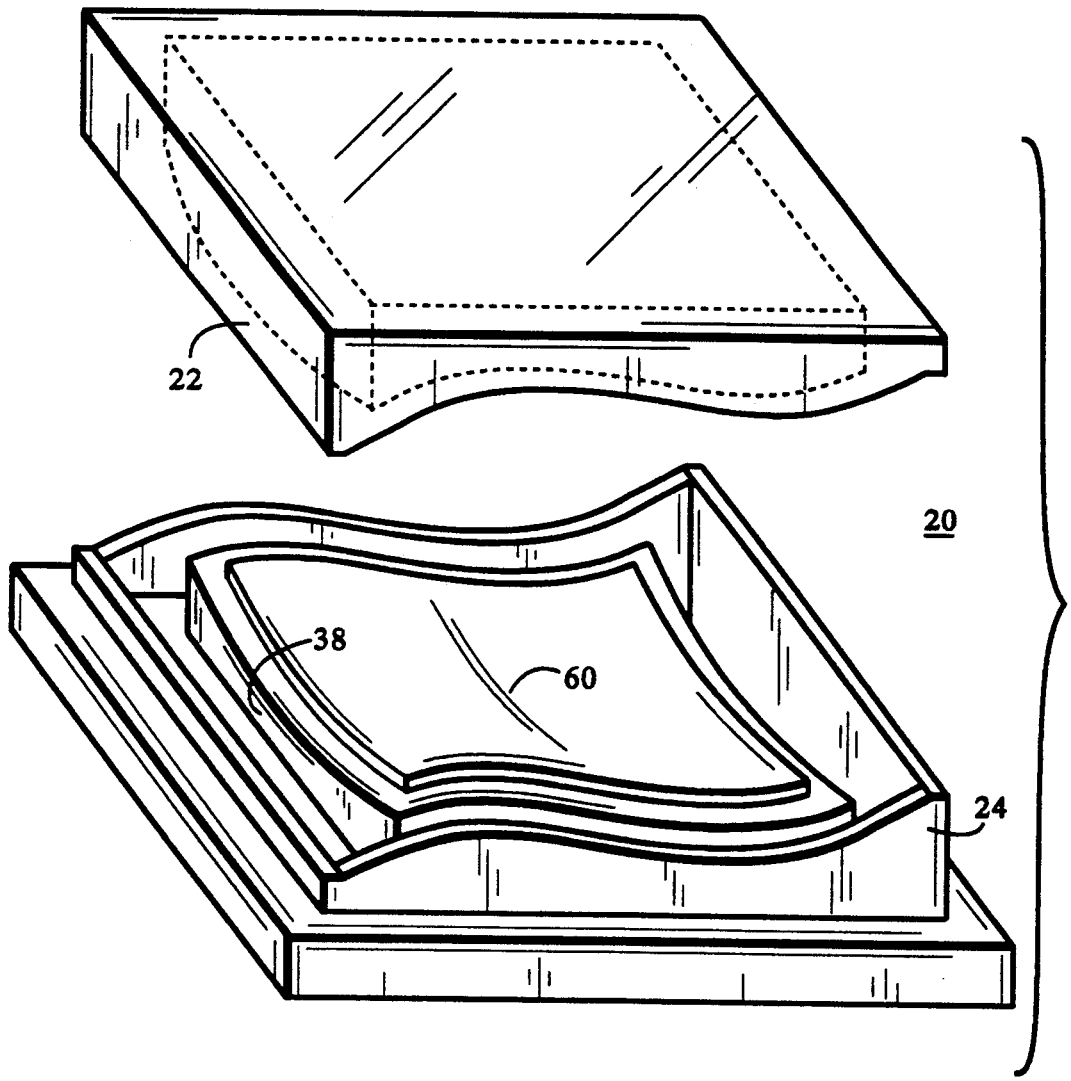
FIG. 6 is a three dimensional view of a form of clamp usable in the process of FIGS. 1-5.

FIG. 6 shows a preferred non-planar form of clamp 20 in detail providing process advantages for certain prelaminate configurations. When upper and lower clamp frame members 22, 24 of the FIG. 6 embodiment are closed on each other, the peripheral contour of the plane of engagement (FIG. 1) is non-planar approaching the peripheral contour of molding surface 28 and rigid (glass) panel 60. When margins of the plastic layers are clamped between cooperating opposing members of such a non-planar clamp, the layers of the composite are formed or preshaped into a configuration intermediate planar and the curvatures of the molding surface and glass panel. This intermediate configuration is defined by the geometry of the non-planar clamp, no strain from stretching being developed during the closing action of the clamp members on each other. Subsequent shaping of this intermediate configuration avoids excessive stretch in local regions near the deepest draw portions of the compound curvature molding surface. Such non-planar clamping also helps avoid wrinkling in individual layers of the plastic composite being shaped. The shape of non-planar clamp 20 can vary from that shown in accordance with the shape of the particular laminate being formed. For configurations less severely curved than that shown, clamp frame members 22, 24 may alternatively be of simpler coplanar shape forming a planar horizontal joint when closed on each other. The non-planar form of clamp 20 is generically usable with alternative shaping systems from that shown in the drawings for forming a prelaminate of layered glass and plastic. For example, such clamp and the desirable preshaping it provides in the plastic layers can be used with a mold of surface curvature where the plastic layers are cooled on the mold surface after shaping, such as disclosed in U.S. Pat. No. 5,069,734. It may further be used with an unheated mold such as disclosed in U.S. Pat. Nos. 4,944,822 and 5,082,515.

For brevity, the apparatus components depicted in FIGS. 2–5 which are the same as in FIG. 1 are not separately numbered.

Figure 2:
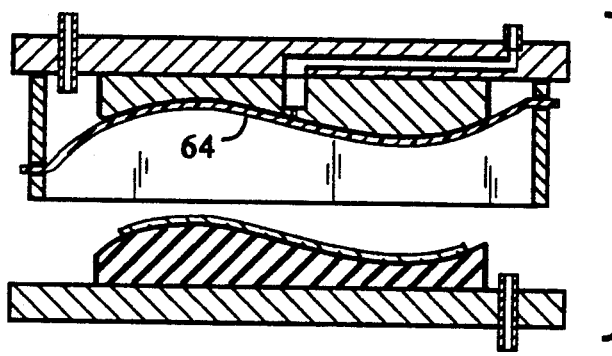
Figure 3:
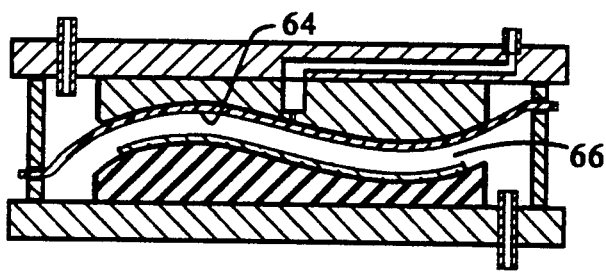
Figure 7:
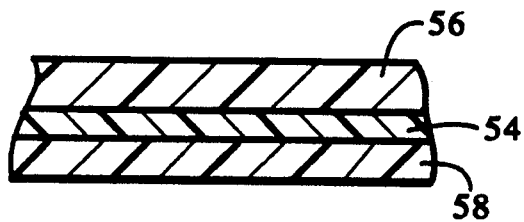
FIG. 7 is a sectional view in enlarged detail of a portion of an assembly of plastic layers usable in the process of FIGS. 1-5.
Figure 8:
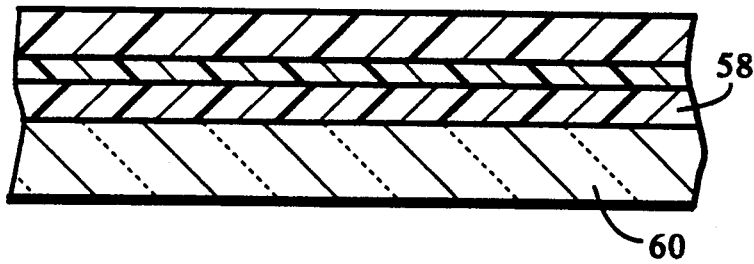
FIG. 8 is a view similar to FIG. 7 of a prelaminate formed using the process of FIGS. 1-5.

The method will now be described for forming shaped prelaminate 50 (FIG. 8) utilizing apparatus 10 of FIGS. 1–6. The assembly 52 in FIG. 7 of plastic layers of prelaminate 50 can vary in composition and number and be arranged differently in sequence from those about to be described. The outer layers of assembly 52 may be the same or different and any of the layers may be optionally coated with a functional layer or surface-treated to enhance performance. An optional though preferred form of assembly 52 of laminatable plastic layers comprises a high modulus, biaxially stretched polyester, (e.g. polyethylene terephthalate) (PET) film 54 having external, cross-linked, self healing polyurethane (PU) layer 56 bonded to one side and facing plasticized partial PVB (i.e. polyvinyl butyral containing 15–25 wt. % hydroxyl groups as polyvinyl alcohol) layer 58 on its other side. Another preferred form replaces the thermoplastic PET and PVB layers with a single layer of thermoplastic polyurethane or other material having the characteristics of thermoplastic polyurethane. To facilitate handling, after first joining PU layer 56 to PET layer 54 in the manner described in U.S. Pat. No. 5,082,515, col. 5, line 59 through col. 7, line 6, the content of which is incorporated herein by reference, layers 54 and 58 of laminatable assembly 52 are then preferably lightly tacked or weakly adhered to each other by bringing them together under the influence of weak pressure in the laminating nip of a cooperating roll assembly, with or without mild heating. A representative form of such assembly employing three rolls is shown in FIG. 2 and described in U.S. Pat. No. 5,069,734, the content of which is incorporated herein by reference. Alternatively, the plurality of plastic layers need not be prebonded and may be initially assembled with opposing faces in unbonded surface contact.

Opposing clamp frame members 22, 24 of clamp 20 are closed on an unheated, unshaped, section of assembly 52 of laminatable plastic layers (FIG. 1) to isolate shapable zone 62 within clamped margins 61 in which the plastic layers are restrained against movement with respect to each other. With the preferred clamp structure of FIG. 6, the components of shapable zone 62 are preshaped into an intermediate configuration approaching the shape of the opposing compound curvature surfaces. After clamping, the assembly of unheated laminatable plastic layers is between upper and lower sections 12 and 14 of press 10 and more particularly between molding surface 28 of mold 26 and subjacent unheated, transparent glass layer 60 yieldably supported on surface 40 of support 38. The surface contour of glass layer 60 is a substantially complementarily shaped negative of molding surface 28. Depending on the plastic to be joined to the glass, the surface of glass layer 60 may optionally be surface treated or coated to promote adhesion to the plastic. Molding surface 28 has been preheated to elevated temperature via heat exchange conductive contact with hot platen 16. The clamped distorted assembly of plastic layers is next moved upwardly toward and against hot molding surface 28. Negative pressure imposed on surface 28 via vacuum developed through communicating nozzles 35 and 37 in platen 16 adjacent the periphery of mold 26 deairs the interface between surface 28 and shapable zone 62. Molding surface 28 may optionally be lightly textured to promote this deairing. As generally known, for optimum optical properties air should be excluded from all interfaces of the glass-plastic layered structure. This is accomplished through selective application of pressure and/or vacuum to the layer interfaces before joining. Alternate approaches from those herein disclosed may be used to accomplish this.

Figure 4:
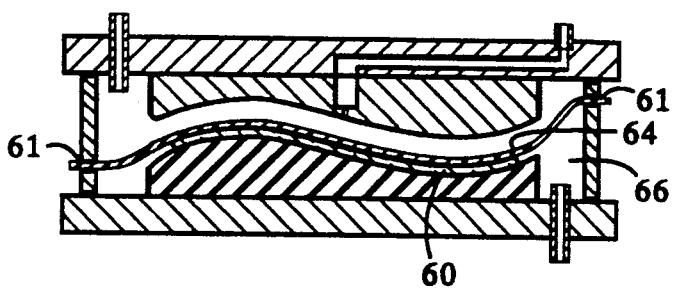

After initial contact of zone 62 with surface 28, continued upward movement slowly forces or draws a progressively increasing area of shapable zone 62 against the hot molding surface causing it to take the compound surface configuration of such molding surface as illustrated in FIG. 2. Clamp 20 with clamped margins 61 restrained against movement continues upward movement until all of zone 62 has stretched into contact with molding surface 28, thereby forming shaped preform 64 of plastic layers from zone 62. Clamp 20 dwells in the up position holding shaped preform 64 (FIG. 2) against molding surface 28 for a time interval adequate for the temperature of the layers of the preform to substantially reach the elevated temperature of molding surface 28. When the shaped preform contains the preferred polyester film layer, the temperature reached by the shaped preform on the molding surface is greater than the temperature to which the final shaped plastic-glass prelaminate is exposed during a downstream autoclave bonding, to be further described. Such temperature heat sets and dimensionally stabilizes the polyester layer in the manner described in U.S. Pat. No. 5,069,734. Generally for the range of plastic layer compositions contemplated, the time interval during which the FIG. 2 position is maintained will vary from about 10 seconds to about 5 minutes depending on the composition of the layers and the extent of curvature being imparted. Glass layer 60, supported against breakage on yieldable surface 40, is moved upwardly toward but not against shaped preform 64 on molding surface 28 (FIG. 3), stopping when lower plate 18 abuts lower clamp frame member 24 (FIG. 3) leaving a gap on the order of about ¼ inch (0.64 cm) between preform 64 and glass layer 60. This position of the apparatus components forms vented compartment 66 between shaped preform 64 on the molding surface and adjacent glass layer 60. Negative pressure is then created within vented compartment 66 to remove air therefrom (FIG. 3) and consequently from the interface between the upper surface of glass layer 60 and the downwardly facing surface of preform 64. Pressurized air is then imposed on shaped preform 64 via the plurality of central holes 36 in the molding surface (FIG. 1) to rapidly force or strip shaped preform 64 off molding surface 28 into surface contact with closely subjacent yieldably supported glass layer 60 (FIG. 4). The previously developed temperature of the plastic layers is preferably high enough so plastic deformation can occur to compensate for any minor differences between the shape of the preform and that of the glass layer. Negative pressure within compartment 66 is preferably maintained during this transfer step to promote sealing edges of shaped preform 64 to glass layer 60. This hot preform transfer step importantly avoids cooling the plastic layers on the molding surface. The molding surface, therefore, can be continuously maintained at elevated temperature ready for the next shaping cycle and need not be cycled up and down in temperature during each shaping cycle.

Figure 5:
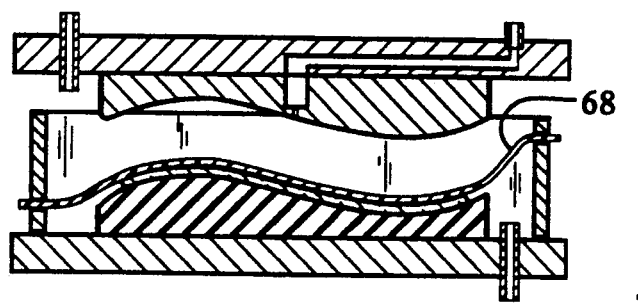

While preferably (i) simultaneously maintaining negative pressure within compartment 66 and positive pressure (via holes 36 in molding surface 28) on the upper surface of the shaped preform now in direct contact with the full surface of unheated glass layer 60, and (ii) maintaining margins 61 of the plastic layers outwardly of the shaped preform clamped (FIG. 4), the shaped preform is held in this position to conductively transfer the heat previously developed in the preform from contact with molding surface 28 from the preform to the glass. The mass of the glass layer (about 0.060 to 0.200 inch (0.15 to 0.51 cm) thick) provides a heat sink to cool the preform. If desired, to accelerate cooling, the glass may be precooled to a temperature which does not result in condensation of volatiles on the glass surface during the process. Shaped preform 64 is thus durably heat-bonded to glass layer 60 across the full extent of their confronting faces as are the plastic layers of the preform similarly heat bonded to each other. The level of bonding to the glass is adequate to avoid air penetration between the glass and plastic when the prelaminate is exposed to high pressure during downstream autoclave bonding. After the temperature of the plastic of the shaped preform is reduced to about 100°–150° F., (38°–66° C.) which usually takes about 10 to 30 seconds in the FIG. 4 position, the vacuum/pressure conditions are terminated and the press opened (FIG. 5). Unwanted portions 68 of plastic layers outward of the periphery of glass layer 60 are trimmed away leaving a finished shaped prelaminate of glass and plastic layers shown as 50 in FIG. 8.

With the preferred embodiment of plastic layers identified previously, shaped, transparent, self healing, cured PU layer 56 of the prelaminate was the upper layer of shapable zone 62.

To form a bilayer glazing panel, the shaped prelaminate 50 is placed in the chamber of a conventional autoclave assembly (not shown) within which conventional elevated temperature and pressure bonding conditions are developed. While therein, the outer external unbonded surface of the plastic layer (56 in FIG. 7) of prelaminate 50 need not be covered, i.e. is free of contact with any covering or shaping member as has been used in the past. The prelaminate is exposed to elevated temperature and pressure within such chamber to increase the strength of the previously established bond at the interface between layer 58 (e.g. plasticized polyvinyl butyral) and glass layer 60 of the prelaminate thereby forming the bilayer glazing panel of compound curvature comprising a substantially wrinkle-free plastic laminate strongly bonded to one side only of transparent glass layer 60. With the system described, autoclave assemblies conventionally used to join two layers of glass to an interposed layer of PVB to form a trilayer safety glazing can be used without modification. By fully forming the prelaminate with glass upstream of autoclaving, the commercially undesirable extended cycles associated with shaping in the autoclave are avoided. The durable prelaminate of shaped layered glass and plastic wherein the plastic is adhered across the entire surface of the glass endures the same autoclave process cycle conventionally used with planar trilayer glazings without wrinkling of any plastic layer.

The invention is further described in the following Example which is for illustration only and not to limit or restrict the invention.

EXAMPLE

Partial (PVB) containing 32 phr dihexyl adipate plasticizer in the form of surface textured sheet 15 mils (0.38 mm) thick was combined with 2 mils (0.05 mm) thick polyethylene terephthalate (PET) film on which had been deposited a 20 mils (0.5 mm) thick layer of cured, transparent polyurethane (PU). To promote adhesion to PVB, the surface of the PET film had been glow treated with oxygen plasma. The partial PVB layer had low surface waviness, having a value for wave index of 9000 square micrometers, as defined in U.S. Pat. No. 5,091,258. The textured surface of the PVB layer was conventional for deairation and is transformed by melting to a smooth surface in known manner during manufacture of the laminated glass. The PVB and coated PET layers were assembled in face to face contact (PU layer uncovered) and placed between two rigid plastic cover boards (about ⅛ inch (0.32 cm) thick) for protection during a double pass through a set of cylindrical rubber-faced nip rolls to deair the PVB/PET interface. The top cover board was removed after the first pass and the assembly of plastic layers subjected to 70° C. for about 5 minutes to increase the temperature of the PVB sufficiently to cause it to heat tack to the PET during the second pass through the nip rolls. After the second pass the PVB and PET were lightly bonded and the interface between the two was devoid of air as determined from the absence of visual air bubbles. This initial deairing and hot tacking is known in the manufacture of laminated glass.

The lightly bonded plastic layers were then subjected to the process of FIGS. 1.5. Molding surface 28 and subjacent annealed float glass layer 60 (0.090 inch (0.23 cm) thick) were of compound curvature. The surface of layer 60 to be joined to the plastic had not been specially coated or treated and layer 60 was at room temperature. Surface 28 and layer 60 were approximately rectangular in peripheral shape (9 in × 11.25 in (23 × 29 cm) and 0.625 in (1.6 cm) deep in the center. This surface approximates the cutout of a segment of a sphere with a 21.5 in (55 cm) radius of curvature. Using a nonplanar clamp frame of the type previously described, the plastic layers were peripherally clamped to minimize stretching in conforming to the curved shape of the molding surface and glass. The specific clamp frame used was bowed in contour in the nature of a cylindrical shape approximating that of the just described glass layer. Molding surface 28 was at 300° F. (149° C.) The glass layer rested on a soft silicone rubber support bed previously cast from the surface contour of the glass. Upward clamp frame movement forced the plastic layers into shaping engagement with the molding surface in the manner of FIG. 2. As the plastic contacted the molding surface a vacuum through port 37 imposed on the region surrounding mold 26 excluded air from the plastic (PU)-mold interface. The supported glass layer was moved upwardly (FIG. 3) and vacuum imposed via ports 40, 42 on lower compartment 66. The shaped plastic was held in contact with molding surface 28 for about 60 sec. to develop about 149° C. in the peripherally clamped layers. Air at about 15 psi (103 kPa) was applied through eight minute holes 36 in molding surface 28 at the end of one inch (2.54 cm) diameter passage 30 on the center line of mold 26. Hole size was 0.015 inch (0.04 cm) diameter. The pressurized air through the holes moved the shaped plastic layers off the molding surface commencing at the center of the mold thereby minimizing air entrapment between the glass and opposite hot PVB plastic. For proper mating contact of the shaped preform and the matching shaped glass, premature contact of the plastic (i.e. PVB) with the margin of the glass should be avoided during this preform transfer step. When hot PVB (or other plastic) contacts unheated glass it immediately adheres and further movement of it is difficult without eventually causing optical defects. It is therefore important to initially place the transferring plastic layers exactly where they should be on the glass. The presence of a gap and the vertical distance of the gap between glass and plastic is important since if too great, plastic transfer will be incomplete whereas if too small entrapped air can develop. In this Example, this adjustable vertical distance was about 0.165 in (0.42 cm). The combination of air pressure on the plastic from above and vacuum from below promoted good edge sealing of plastic to glass, thereby eliminating seepage of air between glass and plastic during the downstream autoclaving step. After transfer, the upper mold section was retracted (vacuum still on the lower compartment) and the FIG. 5 position maintained for about 30 seconds to conductively remove heat from the plastic layers through heat transfer contact with the shaped glass. This period should be sufficient to reduce the plastic temperature sufficiently so layer delamination or air bubble formation between plastic layers does not occur when the vacuum is released and the shaped prelaminate removed from the press. After trimming away unwanted waste, the prelaminate was placed on a shelf in a conventional air autoclave such that the exposed outer PU surface was free of contact with any structural process components. The pressure and temperature were increased to 185 psi. (1275 kPa), 250° F. (121° C.) (the latter being less than the 149° C. to which the plastic layers were heated during shaping) and held for about 20 minutes before being reduced to about 120° F. (49° C.) and ambient pressure. The formed bilayer glazing panel had no wrinkles and was visually observed to be substantially free of optical defects. Small imprints of the molding surface air holes were observed in the otherwise defect-free PU layer which should be readily avoidable by reducing hole size to no greater than about 0.01 in (0.025 cm). Except for such imprints, though held intimately in contact with the hot mold surface during prelaminate forming, the transparent, crosslinked PU surface in the finished bilayer laminate had the same optical quality as originally present before shaping.

Though exposure of the prelaminate to high temperature and pressure in an autoclave to form the finished bilayer glazing panel has been disclosed, depending on the plastic chosen to contact the glass, such autoclave exposure may not be necessary if the appropriate bond strength to glass can be developed in the prelaminate. When this occurs the prelaminate is the finished bilayer glazing panel.

The preceding description is for illustration only and is not to be taken in a limited. Sense. Various modifications and alterations will be readily suggested to persons skilled in the art. It is intended, therefore, that the foregoing be considered as exemplary only and that the scope of the invention be ascertained from the following claims.

What we claim is:

1. A process for forming a shaped prelaminate of glass and plastic which comprises:
    a) drawing an assembly of plastic layers against a hot contoured mold surface to provide a shaped plastic preform at elevated temperature;
    b) transferring the shaped preform without cooling to an adjacent unheated glass layer of substantially matching surface contour to heat bond the shaped plastic preform to the glass layer; and then c) removing heat from the shaped plastic preform via conductive heat transfer to the glass layer to form the shaped prelaminate of glass and plastic.

2. The process of claim 1 wherein the assembly of plastic layers comprises a layer of polyester sandwiched between one outer layer of cross linked polyurethane and another outer layer comprising plasticized partial polyvinyl butyral.

3. A process of forming a shaped prelaminate of glass and plastic layers which comprises:
 a) drawing an assembly of laminatable plastic layers against a hot mold surface having compound curvature to provide a shaped plastic preform at elevated temperature;
 b) positioning adjacent the shaped plastic preform, a supported unheated glass layer of surface shape substantially matching that of the shaped plastic preform;
 c) deairing a space between the shaped plastic preform and the adjacent glass layer;
 d) transferring the shaped plastic preform without cooling to the deaired glass surface to heat bond the shaped preform to the deaired glass layer; and then
 e) removing heat from the shaped plastic preform via conductive heat transfer to the glass layer to form the shaped prelaminate of glass and plastic layers.

4. The process of claim 3 wherein the plastic layers are heat laminated to each other in the shaped preform and the shaped preform is heat bonded to the glass layer across substantially the entire confronting surfaces of the glass and plastic.

5. A process for forming a shaped prelaminate of glass and plastic layers which comprises;
 a) clamping margins of an unheated substantially planar assembly of laminatable plastic layers together to define a shapable zone within the clamped margins in which the plastic layers are restrained against movement with respect to each other;
 b) positioning the clamped assembly of unheated laminatable plastic layers between a molding surface of compound curvature at elevated temperature and a yieldably supported unheated layer of glass of surface contour substantially matching that of the molding surface;
 c) moving the clamped assembly of plastic layers toward the mold surface to force the shapable zone against the molding surface thereby imparting compound curvature to the shapable zone and forming from such zone a shaped preform of plastic layers;
 d) holding the shaped preform against the molding surface until the temperature of the layers of the preform substantially reach the temperature of the molding surface;
 e) moving the yieldably supported layer of glass toward but not against the shaped preform on the molding surface to form a vented compartment between the shaped preform and adjacent glass layer;
 f) creating negative pressure within the vented compartment to remove air therefrom;
 g) forcing the shaped preform off the molding surface into surface contact with the glass layer;
 h) holding the shaped preform under pressure against the unheated glass layer, while maintaining the clamped margins of plastic layers to conductively transfer heat from the preform to the glass and bond the shaped preform to the glass layer; and
 i) trimming unwanted portions of the plastic layers outward of the periphery of the glass layer from the shaped preform to form said prelaminate.

6. The process of claim 5 wherein during step g), negative pressure is maintained within such compartment to promote edge sealing of the shaped preform to the glass layer.

7. The process of claim 6 wherein negative pressure is developed on the molding surface before the shapable zone is applied against the molding surface to deair the interface between the molding surface and the shapable zone.

8. The process of claim 6 wherein the yieldably supported glass layer is subjacent the clamped assembly of laminatable plastic layers and the direction of movement in step e) is upward.

9. The process of any of claims 5, 6, 7 or 8 wherein clamping in step a) is accomplished by closing opposing members of a non-planar clamp on such margins to distort the substantially planar layers of the shapable zone into a configuration approaching that of the molding surface.

10. A process of forming a bilayer glazing panel which comprises:
 a) drawing a clamped lightly bonded composite of transparent plastic layers, which includes a layer of plasticized partial polyvinyl butyral, against a hot, non-planar, contoured mold surface to provide a shaped preform of plastic layers at elevated temperature having the plasticized partial polyvinyl butyral layer as an outer layer of such preform;
 b) transferring the shaped preform without cooling to an adjacent unheated transparent glass layer of substantially matching surface contour to bond the plasticized polyvinyl butyral layer of the shaped plastic preform to the glass layer;
 c) removing heat from the shaped plastic preform via conductive heat transfer to the glass layer to form a shaped prelaminate of glass and plastic layers;
 d) transferring the prelaminate to an autoclave laminating assembly; and
 e) exposing the prelaminate in such assembly to elevated temperature and pressure to increase the bond strength between the plasticized polyvinyl butyral layer and the glass layer and form the bilayer glazing panel of the transparent glass layer and a plastic laminate on one side only of the glass layer.

11. The process of claim 10 wherein during step e) the outer plastic layer of the prelaminate not in contact with the glass sheet is uncovered.

12. The process of claim 11 wherein the composite of plastic layers comprises a layer of polyester sandwiched between one outer layer of cross linked polyurethane and another outer layer of plasticized partial polyvinyl butyral.

13. The process of claim 12 wherein the temperature of the shaped preform on the molding surface reached during step a) is greater than the temperature to which the prelaminate is exposed during step e).

14. The process of any of claims 10, 11, 12 or 13 wherein the clamped composite has a non-planar surface contour approaching that of the molding surface.

15. In the process of forming a prelaminate of layered glass and plastic by steps which include drawing an assembly of optionally lightly bonded plastic layers against a non-planar molding surface, the combination therewith of the step, before drawing, of clamping said assembly of plastic layers between opposing members of a non-planar clamp to form a configuration of the plastic layers approaching that of molding surface.

16. The process of claim 15 wherein the molding surface has compound curvature.

* * * * *